Dec. 31, 1940.  R. W. SIMPSON  2,226,951

FLOWER HOLDER

Original Filed Jan. 13, 1938

INVENTOR
Robert W. Simpson
BY
HIS ATTORNEYS

Patented Dec. 31, 1940

2,226,951

UNITED STATES PATENT OFFICE 2,226,951

FLOWER HOLDER

Robert W. Simpson, New York, N. Y.

Original application January 13, 1938, Serial No. 184,756. Divided and this application July 27, 1939, Serial No. 286,842

6 Claims. (Cl. 47—41)

My invention relates to a flower holder which is particularly adapted for use in connection with the device for exhibiting flowers shown and described in my United States Letters Patent No. 2,046,854, issued July 7, 1936 (reissued March 9, 1937 as Reissue Letters Patent No. 20,289). The present invention, when so used, acts as a combined closure member and holder or support for the stems of the flowers to be exhibited; it may also act as the base upon which the flower exhibiting device of my said reissue patent stands. This application is a division of my copending application Serial Number 184,756, filed January 13, 1938.

Among the objects of my present invention is to provide a holder for flowers which will not deteriorate appreciably with repeated use; into which the flower stems may be quickly and conveniently inserted and positively held, and from which they may be easily withdrawn; which is economical to manufacture; and which, when used in connection with my above-mentioned flower exhibiting device, will perform one or more of the several functions above described. Other objects and advantages of my invention will appear hereinafter and will be appreciated by those skilled in the art to which it appertains.

Figure 1:
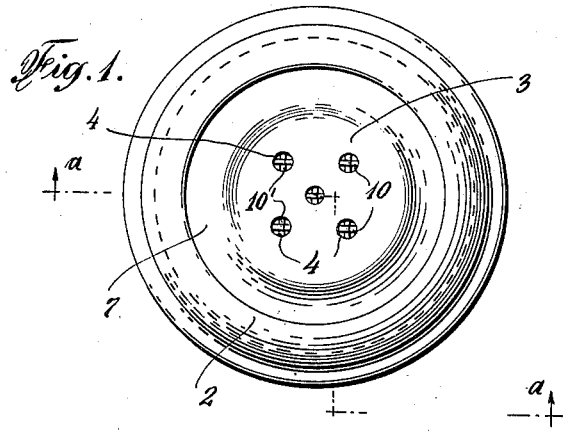
Figure 1 is a plan view of the preferred form of my present invention.

Referring to the drawing, the device 1, of my present invention, in its preferred form, comprises in general a cup-shaped member of soft, elastic rubber, molded in a single piece. An upwardly and inwardly turned flange, 2, is provided around its circumference; also, as an integral part thereof, there is provided a more or less spherical, solid protuberance, or central thickened portion, 3, having a plurality of holes or sockets, 4, molded therein for the purpose of holding the flower stems. The bottom of the device is preferably flat or may be provided with small knobs or posts, 5, upon which the device may stand.

Figure 2:
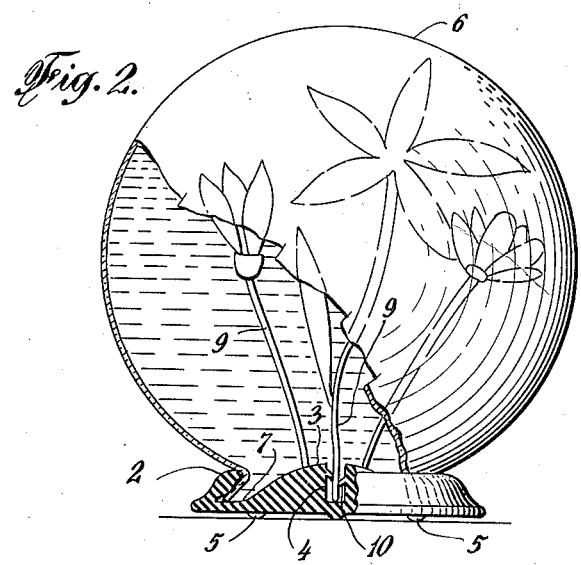
Fig. 2 is a perspective view thereof when used with my flower exhibiting device, certain parts being shown in section on the line a—a of Fig. 1.
Figure 3:
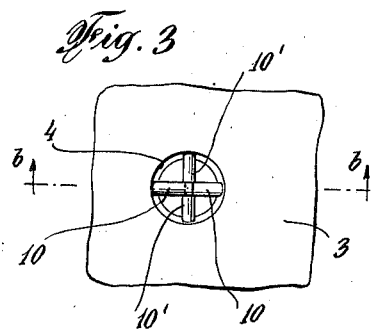
Fig. 3 is an enlarged fragmentary plan view thereof.

One method of using my flower holder is shown in Fig. 2, where it performs the several functions of acting as a base member for a flower exhibiting device, acting as a closure member for the glass bowl of such device, and acting as the holder of the flowers to be exhibited therein. The general structure and principle of such a flower exhibiting device are shown and described in my said Reissue Patent No. 20,289. In such a device, the opening in an inverted glass bowl, 6, filled with water or other transparent liquid, is closed by a cup-shaped rubber member,—the liquid being retained in the bowl by means of a flange on the cup-shaped member, or by atmospheric pressure, or both. Flowers, or any other desired article, are exhibited within the glass bowl,—being supported by a holder associated with the base member.

Thus, utilizing my present invention, the flower stems are inserted in the holes or sockets, 4, so as to project upward into the liquid within the bowl, 6. The neck of the bowl rests on the flat surface, 7, of the combined closure member, base member, and flower holder, and the flange, 2, thereof engages the external surface of the neck of the bowl to retain the liquid therein.

Means are provided within the sockets, 4, to engage the flower stems so that the flowers will not come out of the sockets and float in the liquid within the bowl. In my present form of flower stem engaging means, there are provided a plurality of pins or fingers, 10, 10' (preferably four of them), which are molded integrally with the entire device and are therefore also composed of soft, elastic rubber. Preferably each finger extends from the wall of the socket to approximately the axis thereof. In the preferred arrangement, the second finger is located somewhat below the first and diametrically opposite thereto. The two remaining fingers, 10', are located below the fingers, 10, and are oriented 90° with respect thereto. With this arrangement, as will readily be seen, the flower stem, when inserted in the socket, will be engaged by the resilient fingers at a plurality of places. In view of their pliability, the fingers, when a flower stem is inserted in the socket, will be bent downward,—thereby holding the flower stem in the socket and preventing its coming out except when a comparatively large upward pull is exerted on the stem. In view of the pliability of the fingers 10, 10', however, the flower stems may readily be removed when desired.

Figure 4:
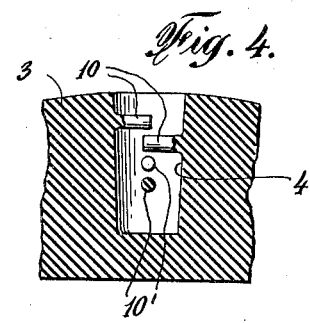
Fig. 4 is a fragmentary cross section thereof, taken on the line b—b of Fig. 3.

If desired, the socket may be tapered so as to become narrower toward the bottom, as shown in Fig. 4.

In its preferred form, the device of the present invention, as stated above, is molded from a single piece of soft, elastic rubber. In prior devices which have been constructed and designed for use with flower exhibiting devices such as the type illustrated in my said Reissue Patent No. 20,289, there have always been certain objectionable features. Thus, where metal springs of the type shown in my said reissue patent are used, it is sometimes difficult to insert flower stems in the stem engaging means without breaking the stems; also the repeated opening and closing of the springs often result in their losing their resiliency with the result that they are no longer suitable to hold flower stems. A number of other types of flower stem engaging means have also been designed, and some of them have been commercially used. Many of them are unsightly, others are difficult or inconvenient to use, and all of them, so far as I know, are more expensive to manufacture and assemble than the device of the present invention. The construction of a holder made entirely of soft, elastic rubber, molded in one piece, is not only of itself more convenient and economical, but the resultant device is more convenient to handle and use. When the present invention is applied to a flower bowl such as shown in my above-mentioned reissue patent, the several operations of inserting the flower stems in the flower holder, inserting the flowers in the bowl, and closing the neck of the bowl are substantially simplified.

It will be understood that modifications may be made in the form and details of devices made according to my present invention, and I desire to secure protection for all such modifications as may come within the scope of the appended claims.

Having described my invention, I claim:

1. A flower holder composed of soft rubber and provided with a flower-stem socket therein, and flower-stem engaging means in the form of a plurality of pliable fingers extending inwardly from the wall of the socket, said fingers being spaced from the bottom of the socket.

2. A flower holder composed of soft rubber, a flower-stem socket therein, and flower-stem engaging means in the form of a plurality of fingers extending inwardly from the wall of the socket, each finger being pliable in the direction of the axis of the socket.

3. A flower holder composed of molded soft rubber and provided with a flower-stem socket therein, and flower-stem engaging means molded within the socket, such means being in the form of a plurality of fingers extending inwardly from the walls of the socket, each of said fingers being pliable in all directions perpendicular to its axis.

4. A device of the kind described composed of molded soft elastic rubber and comprising in combination a substantially cylindrical socket therein, said socket being closed at its bottom, and a plurality of integral pliable fingers extending from the walls of said socket thereinto, said fingers being spaced from the bottom of the socket and at least two of them being peripherally spaced with respect to each other.

5. A flower holder composed of soft rubber and provided with a flower-stem socket therein, and flower-stem engaging means within the socket, said means being in the form of a plurality of pliable fingers at least two of which are located at different distances from the mouth of the socket.

6. A device according to claim 5 in which at least two of the fingers are peripherally spaced with respect to each other.

ROBERT W. SIMPSON.